United States Patent Office 3,424,016
Patented Jan. 28, 1969

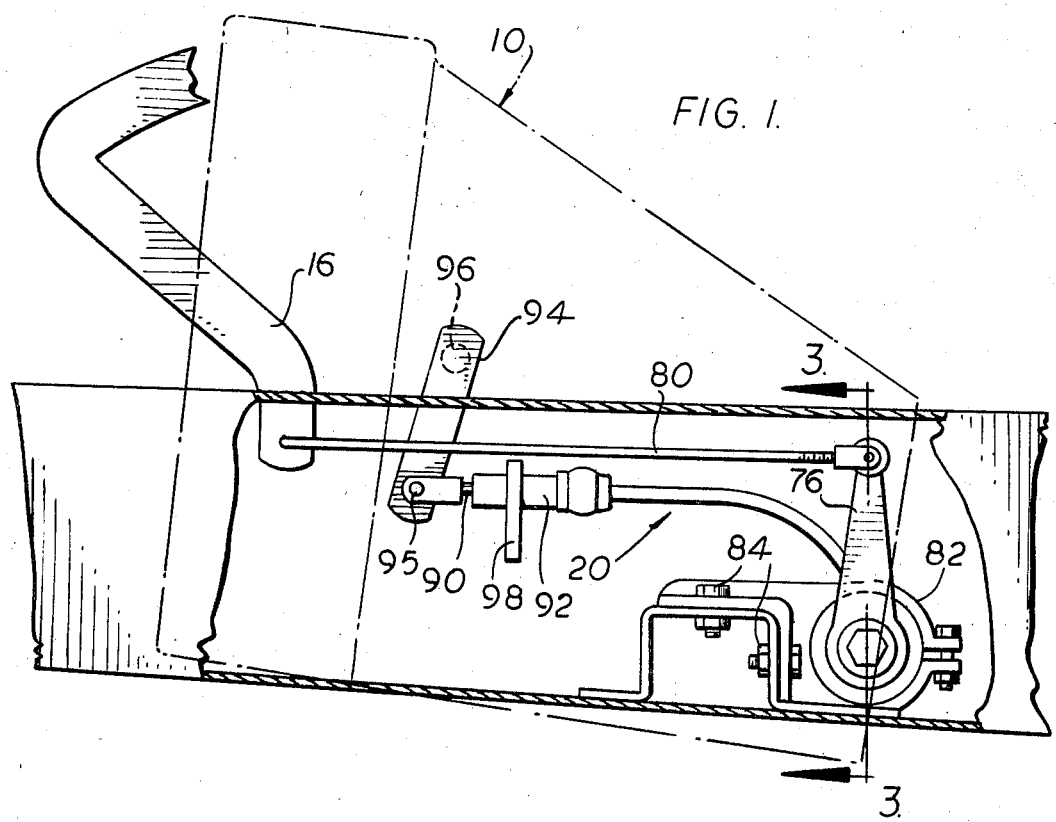
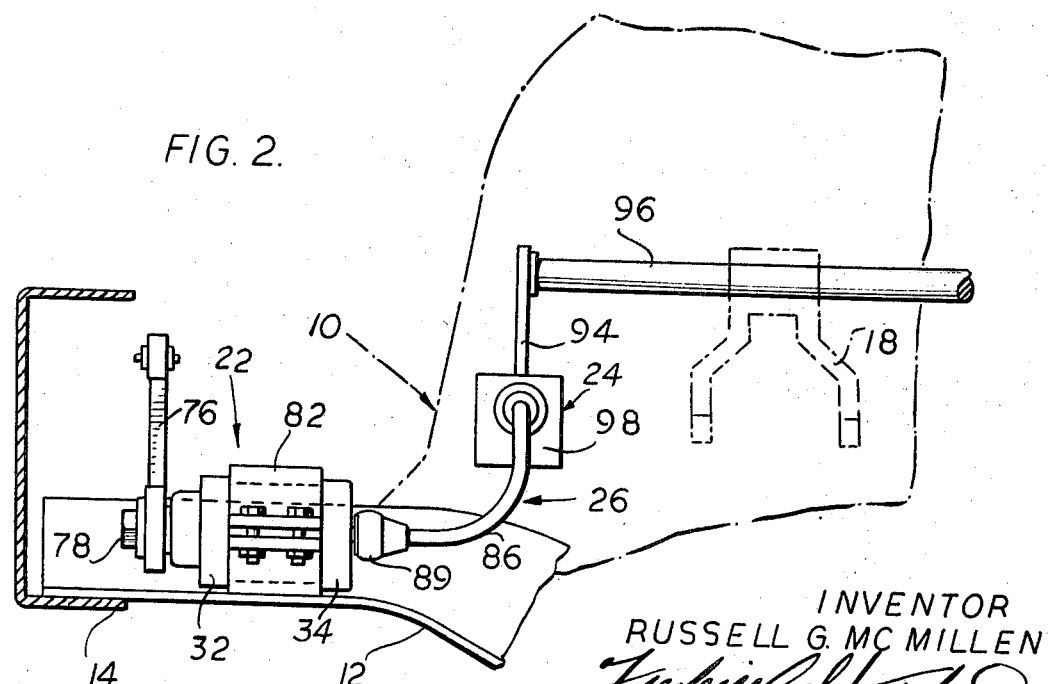

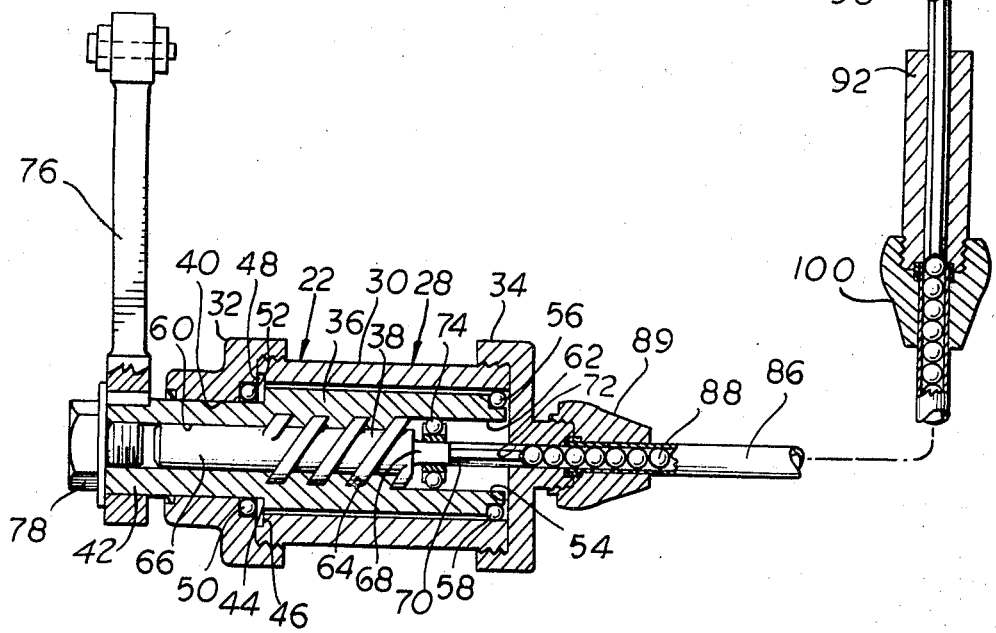
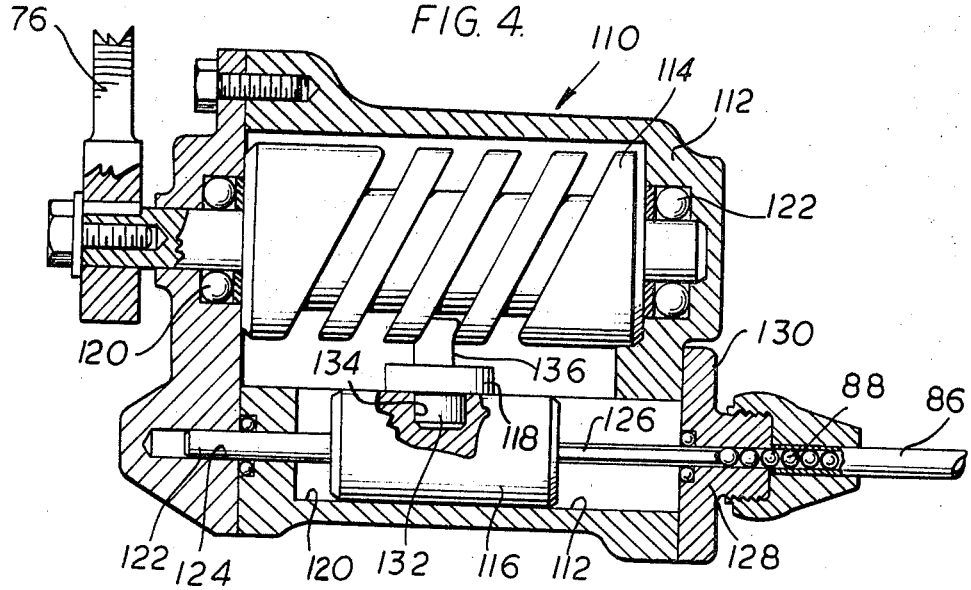

3,424,016
CLUTCH CONTROL DEVICE
Russell G. McMillen, Fort Wayne, Ind., assignor to International Harvester Company, a corporation of Delaware
Filed Oct. 25, 1966, Ser. No. 589,319
U.S. Cl. 74—57          6 Claims
Int. Cl. F16h 25/20, 27/02, 29/20

ABSTRACT OF THE DISCLOSURE

A clutch control device including a control member mounted on the vehicle chassis frame and an actuating member mounted on a resiliently mounted power plant and a flexible motion transmitting means extending between and operatively interconnecting the control and actuating members which flexible motion transmitting means includes a flexible tube having a plurality of roller means disposed therein arranged in a side-by-side relation.

---

This invention relates to clutch control devices and more particularly to devices for use in an environment where the clutch to be actuated is located at a place remote from the place where initial actuation occurs.

A principal object of this invention is to provide a clutch control mechanism which will not be affected by the oscillation of the clutch and engine with which the latter is associated.

Another object is to provide a clutch control device which is remotely positioned from the clutch to be actuated and is operatively connected thereto by a flexible motion transmitting means.

Another object is to provide a positive control but yet flexible linkage means between a clutch control pedal mounted on an automotive chassis frame and a clutch actuating lever associated with an engine resiliently mounted on the frame.

The above and other objects and advantages will be more readily apparent when read in conjunction with the accompanying drawings in which:

FIGURE 1 is a side view in elevation of the clutch control mechanism embodying the invention;

FIGURE 2 is a view in elevation showing the clutch control mechanism mounted on a frame member and connected to a clutch actuating lever;

FIGURE 3 is an elevation view in section of the clutch control device connected by a flexible connection to clutch actuating lever;

FIGURE 4 is an elevation view in section of another embodiment of a clutch control device.

Referring now to the drawings wherein like reference characters in the several views designate the same parts, 10 represents the outline of a power plant or engine which in an automotive vehicle would normally be resiliently mounted on a chassis frame by means of resilient mounting pads, for example. It would be mounted on a plurality of transverse frame members 12 of the chassis. The latter in turn would extend between and be connected by suitable means to longitudinally extending channel irons on each side of the vehicle one of which is shown at 14. A clutch pedal 16 is mounted on the channel iron by a pivotal mounting (not shown). The clutch pedal 16 is used to operate a clutch operating lever 18 of a clutch associated with the engine 10. Since a clutch associated with an automotive vehicle is normally engaged and the clutch pedal is operated to release the clutch, the operating lever 18 is sometimes referred to as a clutch throwout lever.

It is apparent that a direct connection between the clutch pedal 16 and clutch operating lever 18 is not possible. Because of the oscillating movements that occur between the engine on which the clutch is mounted and the chassis frame on which the clutch pedal is mounted, some kind of a clutch control means must be provided to transmit movement of the clutch pedal 16 to the clutch operating lever 18. I have provided such a clutch control means designated generally as 20.

The clutch control means 20 comprises a control means 22, a clutch actuating means 24 and a flexible motion transmitting means 26 connecting the control means 22 and clutch actuating means 24.

The control means 22 comprises a housing 28 formed by a tubular body 30 having end cap members 32 and 34 threaded onto opposite ends thereof. A cylindrical shaft 36 in the form of a female worm cylinder is rotatably disposed in a bore 38 of the housing 28. A reduced end portion of the shaft 36 extends through one end thereof through the end cap 32. The end cap 32 has an axial bore 40 formed therein to receive the end 42 of the shaft 36 therethrough. The shaft 36 is rotatable in the bore 38 of the housing 28 but is confined against axial movement for reasons which will become apparent. The end 42 of shaft 36 being of smaller diameter than the main body portion of shaft 36 disposed in bore 38 forms a shoulder 44 with the main body portion. In the assembly a retainer ring 46 surrounds the end 42 and fits into a recess 48 in one end of the tubular body 30. It is secured in place by the end cap 32. The retainer ring 46 having an inner diameter which is less that the diameter of main body portion of the shaft 36 provides in its secured position in the assembly a radially inwardly projecting portion against which the shoulder 44 of shaft 36 can abut. In other words, it confines the shaft 36 against axial movement to the left as viewed in FIGURE 3. A roller bearing 50 may be disposed in a counterbore 52 to support shaft 36 in end cap 32. The shaft 36 is of such a length that its right end as viewed in FIGURE 3 is disposed close to the inner face 54 of the end cap 34. Thus, shaft 36 is confined against any substantial axial movement to the left as seen in FIGURE 3 by retainer ring 46 and to the right by end cap 34. A roller bearing 56 may be disposed in recess 58 at the end of shaft 36 to support shaft 36 in bore 38.

A longitudinally extending axial bore 60 is formed in the shaft 36. At the right end, as viewed in FIGURE 3, the bore 60 is enlarged by counterbore 62 extending approximately one fourth of the length of shaft 36. Threads 64 in the form of a helical worm are formed in a portion of the length of bore 60 and preferrably are of the Acme type.

A male worm shaft 66 is disposed in bore 60 and engages the internal threads 64 of the female worm cylinder shaft 36. The right end 68 of shaft 66 is formed with a smaller diameter than the remainder of shaft 66. A portion of the end 68 is formed with a hexagonal periphery 70 or other nonround configuration so that it may slide back and forth in an axially extending mating bore 72 formed in end cap 34 but cannot rotate therein. The right end of shaft 66 acts as a plunger as will be hereinafter more apparent. Therefore, since shaft 36 is confined against axial movement and shaft 66 is confined against rotational movement, any rotation of shaft 36 will cause linear movement of shaft 66 due to the threaded engagement between the two shafts. The shaft 36 thus acts as a driving member and shaft 66 as a driven member. A bearing member 74 which may be a roller bearing supports the end 68 of shaft 66 in counterbore 62 of shaft 36, the other end of shaft 66 being supported by a rotating sliding fit in bore 60 of shaft 36.

A lever 76 is attached to suitable means, such as keying, to the end of shaft 36 extending through end cap 32.

A flanged bolt 78 threaded into bore 60 may further serve to hold the lever 76 in place. The end of lever 76 is connected to the clutch pedal 16 by suitable means such as a tie rod 80 so that actuation of the clutch pedal will rotate lever 76 and the cylindrical shaft 36.

The control unit 22 is mounted on transverse frame member 12 by suitable bracket means 82 secured to the member 12 by bolts 84.

The motion transmitting means 26 comprises flexible tubing 86 or a formed steel tube filled with a plurality of balls 88. One end of the tubing 86 is attached to end cap 34 by flange 89 and the balls 88 are in contact with the plunger end 68 of male worm shaft 66 which extends into end cap 34. The other end of the tubing 86 is operatively associated with the clutch actuating means 24.

The clutch actuating means 24 includes a push rod 90 slidably disposed in a housing 92 and functioning as a second driven member. The rod 90 is connected to one end of lever 94 by a pivotal connection 95. The other end of lever 94 is fixed to a transverse shaft 96 carrying the clutch operating lever 18. The housing 92 is supported in a bracket 98 which is mounted on the engine 10. The rod 90 may have a hexagonal periphery machined thereon or it may have some other non-round cross-sectional periphery so that it will not rotate in a mating bore in housing 92. The tubing 86 is attached to the housing 92 being secured thereto by flange 100. The balls 88 in the tubing are also in contact with the end of push rod 90. It will be apparent that movement of plunger end 68 of shaft 66 to the right as viewed in FIGURE 3 will move the continuous string of balls 88 in the tubing against the end of push rod 90 to thereby rotate lever 94 in a clockwise direction as seen in FIGURE 1. Thus the transverse shaft 96 fixed to lever 94 will also be rotated, and will move the clutch operating lever 18.

While the operation of the clutch control device undoubtedly is understood from the foregoing details of construction, a summary of the operation will now be given. To operate the clutch associated with the engine 10 the operator of the vehicle carrying the engine steps on the clutch pedal 10. If the clutch pedal 16 is pivotally mounted so that counterclockwise operation of it as viewed in FIGURE 1 will move lever 76 in a clockwise direction, the rotation of the female worm shaft 36 will cause the shaft 66 to move to the right as viewed in FIGURE 3. The plunger end 68 of shaft 66 is moved against the adjacent ball 88 moving all the balls 88 through the tubing 86 against push rod 92. This rotates lever 94 and the transverse shaft 96 to operate the clutch actuating lever in a well known manner to release the clutch. When the clutch pedal 16 is released by the operator, spring actuators on the clutch as well known in the clutch art move the clutch actuating lever 18 back to its original position. This moves the balls 88 back to their original position and moves the shaft 66 back to the left to rotate the cylindrical shaft 36 and the clutch pedal 16 back to its normal position. A flexible cable interconnecting end 68 of shaft 66 and push rod 90 could be used in place of the balls 88.

In FIGURE 4 another embodiment of a control device similar to device 22 and designated generally as 110 is illustrated. The similarities between the control devices of FIGURES 3 and 4 are quite apparent. In both devices a driving cammed member in the form of a worm shaft is rotated to produce a resultant linear motion in a cooperating driven member which in turn acts on a flexible motion transmitting means shown in both cases to be moveable balls in flexible tubing or a formed metal tube.

The control device 110 comprises a housing 112, a driving member in the form of an externally threaded worm shaft 114 rotatably mounted in the housing 112 and adapted to be rotated by the lever 76, a driven member in the form of a linearly moveable member 116 slidably mounted in the housing 112 and operatively connected to the driving member by a follower 118. The housing 112 may be secured to transverse member 12 by bracket securing means in the same manner as indicated for housing 28.

The worm shaft 114 is rotatably mounted in the housing 112 by means of bearing members 120 and 122 at each end thereof. These may be roller bearings. The shaft 114 is constrained against axial movement in the housing. The left end of the shaft as seen in FIGURE 4 projects through the housing and the lever 76 is connected thereto in a manner similar to the embodiment of FIGURE 3.

The linearly moveable driven member 116 may be in the form of a slidable block positioned in a guideway 120 in the housing 112. A guide member in the form of a shaft 122 may be connected to or form an integral part of member 116 to help support the member 116 in its proper position. This shaft 122 is adapted to slide back and forth in bore 124 formed in the housing 112. A plunger 126 is connected to the member 116 and extend through bore 128 in end cap 130 to act on balls 88 in flexible tubing 86. The tubing 86 may be connected to end cap 130 in a manner similar to that shown in connection with the embodiment of FIGURE 3.

The follower 118 operatively connecting worm shaft 114 to the slidable member 116 may be connected to the member 116 by a boss 132 received by a bore 134 in the member 116. A projection 136 engages the worm threads on shaft 114 and is slidably moveable therein as the shaft 114 is rotate. The follower 118 and in particular the portion cooperating with the threads of shaft 114 is designed to function smoothly without jamming during rotation of the shaft 114.

Rotation of the shaft 114 clockwise as viewed from the left end of FIGURE 4 will cause the sliding member 116 to move to the right moving the balls 88 in the tube to actuate the push rod 90 the lever 94 and the clutch throwout lever 18. Here again the shaft 114 acts as a driving member and the linearly movable member 116 as a driven member.

It will be apparent that I have advantageously provided a clutch operating system which through the flexible connections compensates for and absorbs the relative movements between a vehicle and the engine resiliently mounted thereon. Furthermore, the control means can be conveniently mounted on the frame remote from the clutch to be operated without too much concern about alignment of units in the system. In addition, the system includes sturdy positive control devices which are easy to manufacture and not easily susceptible to damage.

While certain preferred embodiments of the invention have been specifically disclosed, it is to be understood that the invention is not limited thereto as other variations will be readily apparent to those skilled in the art and the invention is to be given its fullest possible interpretation within thet terms of the following claims.

I claim:
1. In a motion transmitting control device, the combination comprising: a housing; an internally threaded, cylindrical driving member having an actuating means connected thereto, said member being rotatably mounted in said housing and confined against any substantial longitudinal movement; an externally threaded driven member threaded into said driving member, said driven member being movable lonigtudinally in said housing and confined against any substantial rotational movement; and bearing means interposed between said driving and driven members.

2. In a vehicle having a chassis frame and an engine yieldably mounted thereon and including a clutch, the combination comprising: a clutch control member carried by and pivotal with respect to said frame about a transverse axis; a clutch actuating member carried on said engine and movable with respect thereto to effect engagement and disengagement of said clutch; and means for operatively interconnecting said control member and said actuating member whereby pivotal movement of said control member effects simultaneous movement of said actuating member including, a housing, rigidly mounted on said frame, a driving member having said control member fixed to one end thereof, said member being rotatably mounted in said housing and confined against any substantial movement along its rotational axis, said rotational axis serving as the pivotal axis of said control member, a driven member disposed within said housing and operatively engaged by said driving member, said driven member being confined against any substantial rotational movement and movable along its longitudinal axis upon rotation of said driving member, a plunger fixed to said driven member and disposed within said housing; means operatively interconnecting said plunger and said actuating member whereby movement of said plunger in one direction effects simultaneous movement of said actuating member to disengage the clutch including flexible motion transmitting means.

3. The combination of claim 2 wherein said flexible motion transmitting means includes flexible tube means and roller means disposed in said tube means, said roller means being engageable by said plunger and being effective to transmit motion between said plunger and said clutch actuating member when the clutch control member is pivoted.

4. The combination of claim 2 wherein said driving member is an internally threaded cylinder rotatably disposed in said housing and substantially confined against longitudinal movement, said driven member is a threaded shaft concentrically disposed in said cylinder and adapted to be linearly driven by said driving member, and wherein bearing means interposed between said driving and driven members are provided.

5. The combination of claim 2 further including a second housing mounted on the engine, and said means operatively interconnecting said plunger and said actuating member includes plunger disposed and slidable in said second housing, said second plunger being operatively connected to said actuating member and being engaged by said flexible motion transmitting means.

6. The combination of claim 2 wherein:
said driving member is an externally threaded shaft rotatably disposed in said housing and substantially confined against longitudinal movement,
said driven member comprises a linearly movable member disposed in said housing and movable along an axis of travel which is disposed substantially parallel and spaced from the axis of said driving member.

References Cited

UNITED STATES PATENTS

| 1,351,753 | 9/1920 | Hover | 74—57 |
| 1,594,277 | 7/1926 | Stanley | 74—57 |
| 2,788,424 | 7/1957 | Huelskamp et al. | 74—89.15 |
| 2,869,377 | 1/1959 | Pieterse | 74—501 |
| 2,957,353 | 10/1960 | Babacz | 74—501 |

FOREIGN PATENTS 344,095  11/1921  Germany.

FRED C. MATTERN, JR., *Primary Examiner.*

W. S. RATLIFF, JR., *Assistant Examiner.*